US010887761B2

(12) United States Patent
Wu (10) Patent No.: US 10,887,761 B2
(45) Date of Patent: Jan. 5, 2021

(54) DEVICE AND METHOD FOR HANDLING A TEMPORARY USER EQUIPMENT CAPABILITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/908,837

(22) Filed: Mar. 1, 2018

(65) Prior Publication Data

US 2018/0255452 A1 Sep. 6, 2018

Related U.S. Application Data

(60) Provisional application No. 62/465,171, filed on Mar. 1, 2017.

(51) Int. Cl.
*H04W 8/24* (2009.01)
*H04W 8/22* (2009.01)
(Continued)

(52) U.S. Cl.
CPC .............. *H04W 8/24* (2013.01); *H04W 8/22* (2013.01); *H04W 36/08* (2013.01); *H04W 76/27* (2018.02); *H04W 36/0055* (2013.01)

(58) Field of Classification Search
CPC . H04W 36/0055; H04W 36/08; H04W 76/27; H04W 8/22; H04W 8/24
See application file for complete search history.

(56) References Cited

U.S. PATENT DOCUMENTS

2010/0113024 A1\* 5/2010 Wu ................. H04W 36/14
455/436
2010/0323753 A1 12/2010 Imamura
(Continued)

FOREIGN PATENT DOCUMENTS

CN 101690286 A 3/2010
CN 101730058 A 6/2010
(Continued)

OTHER PUBLICATIONS

Search Report dated Aug. 1, 2018 for EP application No. 18159563.8, pp. 110.
(Continued)

*Primary Examiner* — Khaled M Kassim
(74) *Attorney, Agent, or Firm* — Winston Hsu (57) ABSTRACT

A first base station for handling a temporary UE capability comprises at least one storage device for storing instructions and at least one processing circuit coupled to the storage device. The at least one processing circuit is configured to execute the instructions stored in the at least one storage device. The instructions comprise receiving a UE capability from a communication device, a second BS or a core network; receiving a first message indicating a temporary UE capability from the communication device; transmitting a first configuration to the communication device according to the temporary UE capability; transmitting a Handover Request message to the second BS to initiate a handover to the second BS; and receiving a Handover Request Acknowledge message from the second BS, in response to the Handover Request message.

18 Claims, 6 Drawing Sheets

(51) Int. Cl.
*H04W 76/27* (2018.01)
*H04W 36/08* (2009.01)
*H04W 36/00* (2009.01)

(56) References Cited

U.S. PATENT DOCUMENTS

| | | | |
|---|---|---|---|
| 2012/0224561 A1* | 9/2012 | Fang | H04W 76/10 370/331 |
| 2014/0199996 A1* | 7/2014 | Wang | H04W 36/14 455/426.1 |
| 2014/0254559 A1* | 9/2014 | Tie | H04W 36/24 370/332 |
| 2015/0117400 A1* | 4/2015 | Gopal | H04W 36/0055 370/331 |
| 2015/0341837 A1* | 11/2015 | Zhao | H04W 48/18 455/436 |
| 2015/0382257 A1* | 12/2015 | Jang | H04W 36/20 370/331 |
| 2016/0029275 A1* | 1/2016 | Guo | H04W 8/22 455/436 |
| 2016/0044730 A1 | 2/2016 | Baghel | |
| 2016/0157228 A1 | 6/2016 | Yum | |
| 2016/0262144 A1* | 9/2016 | Kitazoe | H04W 76/27 |
| 2016/0316358 A1 | 10/2016 | Orr | |
| 2016/0323800 A1* | 11/2016 | Ulupinar | H04W 36/38 |
| 2017/0215065 A1* | 7/2017 | Vamanan | H04W 8/24 |
| 2018/0020382 A1* | 1/2018 | Kim | H04W 36/0055 |
| 2018/0063785 A1* | 3/2018 | Boixadera-Espax | H04W 52/0287 |
| 2018/0227816 A1* | 8/2018 | Wu | H04W 36/08 |
| 2019/0274076 A1* | 9/2019 | Kim | H04W 36/08 |

FOREIGN PATENT DOCUMENTS

| | | |
|---|---|---|
| CN | 102340772 A | 2/2012 |
| CN | 105453650 A | 3/2016 |
| CN | 106256142 A | 12/2016 |
| WO | 2016/025548 A1 | 2/2016 |

OTHER PUBLICATIONS

Qualcomm Incorporated, "UE overheating problem", 3GPP TSG-RAN WG2 Meeting #99, R2-1708978, Aug. 21-25, 2017, Berlin, Germany, XP051318775, pp. 1-5.
Ericsson, "Proposed procedure to handle Uplink Multislot Output Power", 3GPP TSG GERAN #15, Tdoc GP-031544, Jun. 23-27, 2003, Fort Lauderdale, FL USA, XP050008794, pp. 1-4.
Intel Corporation, "Use cases for UE initiated capability change", 3GPP TSG-RAN WG2 Meeting #97, R2-1701741, Feb. 13-17, 2017, Athens, Greece, XP051212314, pp. 1-3.
Huawei, HiSilicon, MediaTek Inc., "Thermal issues with high capability UEs", 3GPP TSG-RAN WG2 #97, R2-1701835, Feb. 13-17, 2017, Athens, Greece, XP051212399, pp. 1-5.
Huawei, "Report of email discussion [98#43][LTE/TEI14] UE overheating problem", 3GPP TSG-RAN WG2 #99, R2-1708219, Aug. 21-25, 2017, Berlin, Germany, XP051318122, pp. 1-16.
Huawei, HiSilicon, IPCom, "Low overhead signalling for UE overheating indication", 3GPP TSG-RAN WG2 #99, R2-1709696, Aug. 21-25, 2017, Berlin, Germany, XP051330348, pp. 1-4.
3GPP TSG-RAN WG2 Meeting #100, R2-1714010, Reno, Nevada, USA, Nov. 27-Dec. 1, 2017, Section 5.6.10.3.
Search Report dated Apr. 30, 2018 for EP application No. 18159563.8, pp. 1-28.
Office action dated Apr. 28, 2020 for the China application No. 201810172673.3, filing date Mar. 1, 2018, p. 1-8.

\* cited by examiner

DEVICE AND METHOD FOR HANDLING A TEMPORARY USER EQUIPMENT CAPABILITY

CROSS REFERENCE TO RELATED APPLICATIONS

This application claims the benefit of U.S. Provisional Application No. 62/465,171 filed on Mar. 1, 2017, which is incorporated herein by reference.

BACKGROUND OF THE INVENTION

1. Field of the Invention

The present invention relates to a device and a method used in a wireless communication system, and more particularly, to a device and a method of handling a temporary user equipment (UE) capability in a wireless communication system.

2. Description of the Prior Art

When a UE connects to a first base station (BS), the first BS may request the UE to transmit a UE capability. The UE may transmit a message to the first BS to indicate a temporary change of the UE capability (e.g., due to an occurrence of an overheating problem in the UE).

SUMMARY OF THE INVENTION

The present invention therefore provides a communication device for handling a temporary UE capability to solve the abovementioned problem.

A first BS for handling a temporary UE capability comprises at least one storage device for storing instructions and at least one processing circuit coupled to the at least one storage device. The at least one processing circuit is configured to execute the instructions stored in the at least one storage device. The instructions comprise receiving a UE capability from a communication device, a second BS or a core network (CN); receiving a first message indicating a temporary UE capability from the communication device; transmitting a first configuration to the communication device according to the temporary UE capability, when receiving the message; transmitting a Handover Request message to the second BS to initiate a handover to the second BS, wherein the Handover Request message comprises the UE capability and the temporary UE capability; and receiving a Handover Request Acknowledgement message from the second BS, in response to the Handover Request message, wherein the Handover Request Acknowledgement message comprises a handover command, and the handover command comprises a second configuration determined by the second BS according to the temporary UE capability.

A communication device for handling a temporary UE capability comprises a storage device for storing instructions and a processing circuit coupled to the storage device. The processing circuit is configured to execute the instructions stored in the storage device. The instructions comprise transmitting a UE capability to a network, when entering a RRC_CONNECTED state from a RRC_IDLE state or a RRC_INACTIVE state at a first time instant; transmitting a message indicating a temporary UE capability to the network, when entering the RRC_CONNECTED state from the RRC_IDLE state or the RRC_INACTIVE state at a second time instant; and transmitting the message indicating the temporary UE capability to the network, when entering the RRC_CONNECTED state from the RRC_IDLE state or the RRC_INACTIVE state at a third time instant.

A first BS for handling a temporary UE capability comprises a storage device for storing instructions and a processing circuit coupled to the storage device. The processing circuit is configured to execute the instructions stored in the storage device. The instructions comprise receiving a UE capability from a communication device, a second BS or a core network; receiving a message indicating a temporary UE capability, from the communication device; transmitting a first configuration to the communication device according to the temporary UE capability; releasing the temporary UE capability, when configuring the communication device to enter a RRC_IDLE state or a RRC_INACTIVE state; and transmitting a second configuration to the communication device according to the UE capability, when configuring the communication device to enter the RRC_CONNECTED state from the RRC_IDLE state or the RRC_INACTIVE state and after releasing the first configuration.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
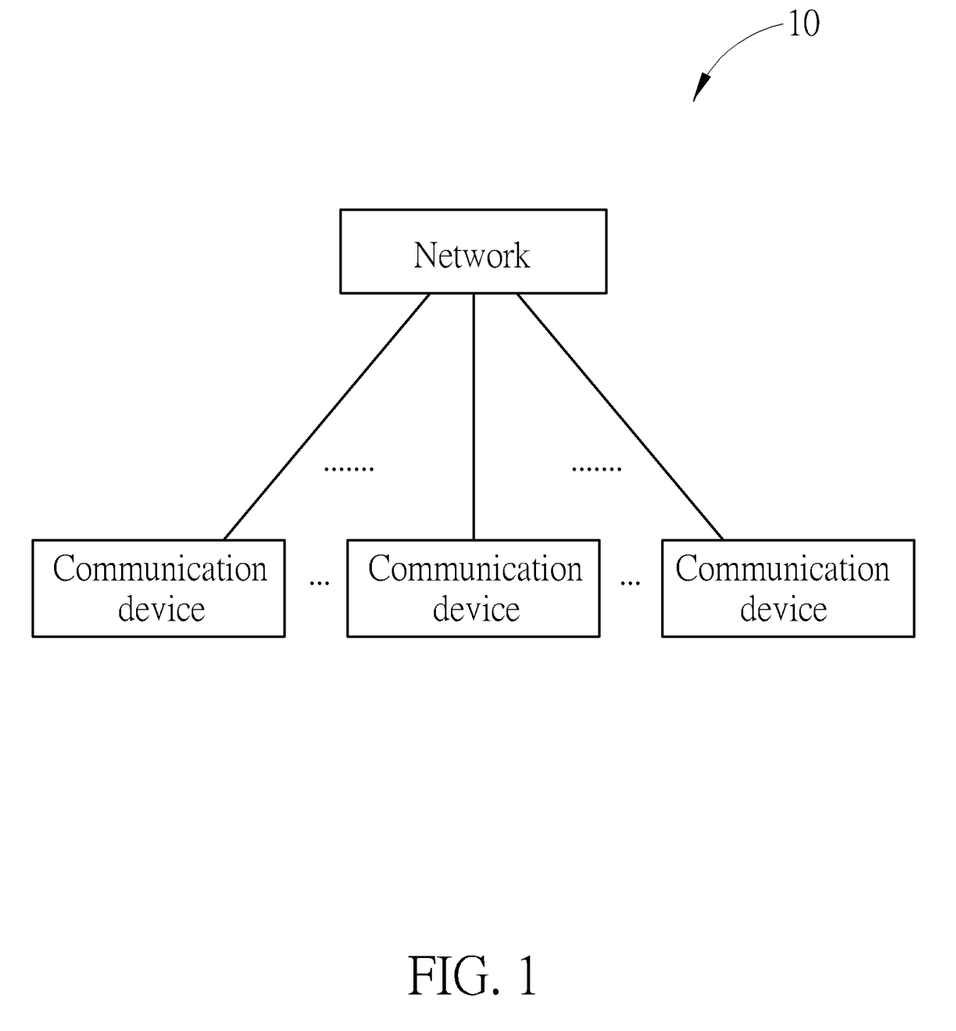
FIG. 1 is a schematic diagram of a wireless communication system according to an example of the present invention.

FIG. 1 is a schematic diagram of a wireless communication system 10 according to an example of the present invention. The wireless communication system 10 is composed of a network and a plurality of communication devices. The network and a communication device may communicate with each other via one or more carriers of licensed band (s) and/or unlicensed band(s). The network and the communication device may communicate with each other via one or multiple cells (e.g., multiple carriers) belonging to one or multiple base stations (BSs).

In FIG. 1, the network and the communication devices are simply utilized for illustrating the structure of the wireless communication system 10. Practically, the network may comprise at least one of a long-term evolution (LTE) network and a new radio (NR) network. The LTE network may comprise at least one of an evolved universal terrestrial radio access network (E-UTRAN) including at least one evolved Node-B (eNB) and an Evolved Packet Core (EPC). The NR network may comprise a fifth generation (5G) radio access network including at least one 5G BS (called gNB or an evolved eNB (eLTE eNB)) and a Next Generation Core (NGC).

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction of transmission (i.e., transmission direction), e.g., for an uplink (UL), the communication device is the transmitter and the network is the receiver, and for a downlink (DL), the network is the transmitter and the communication device is the receiver.

Figure 2:
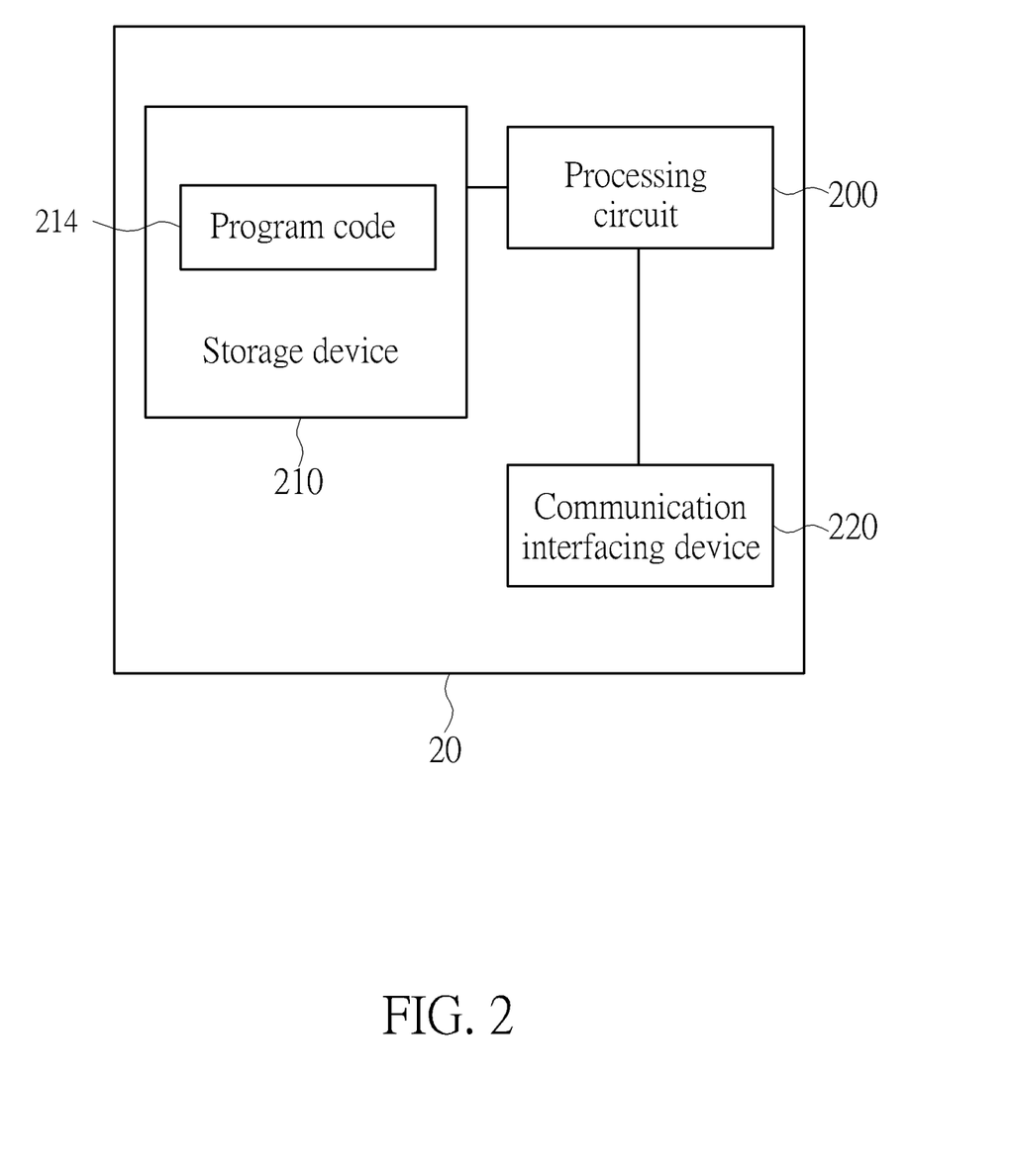
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 of which each may be a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 comprises at least one transceiver used to transmit and receive signals (e.g., data, messages and/or packets) according to processing results of the at least one processing circuit 200.

In the following embodiments, a UE is used for representing a communication device in FIG. 1, to simplify the illustration of the embodiments.

Figure 3:
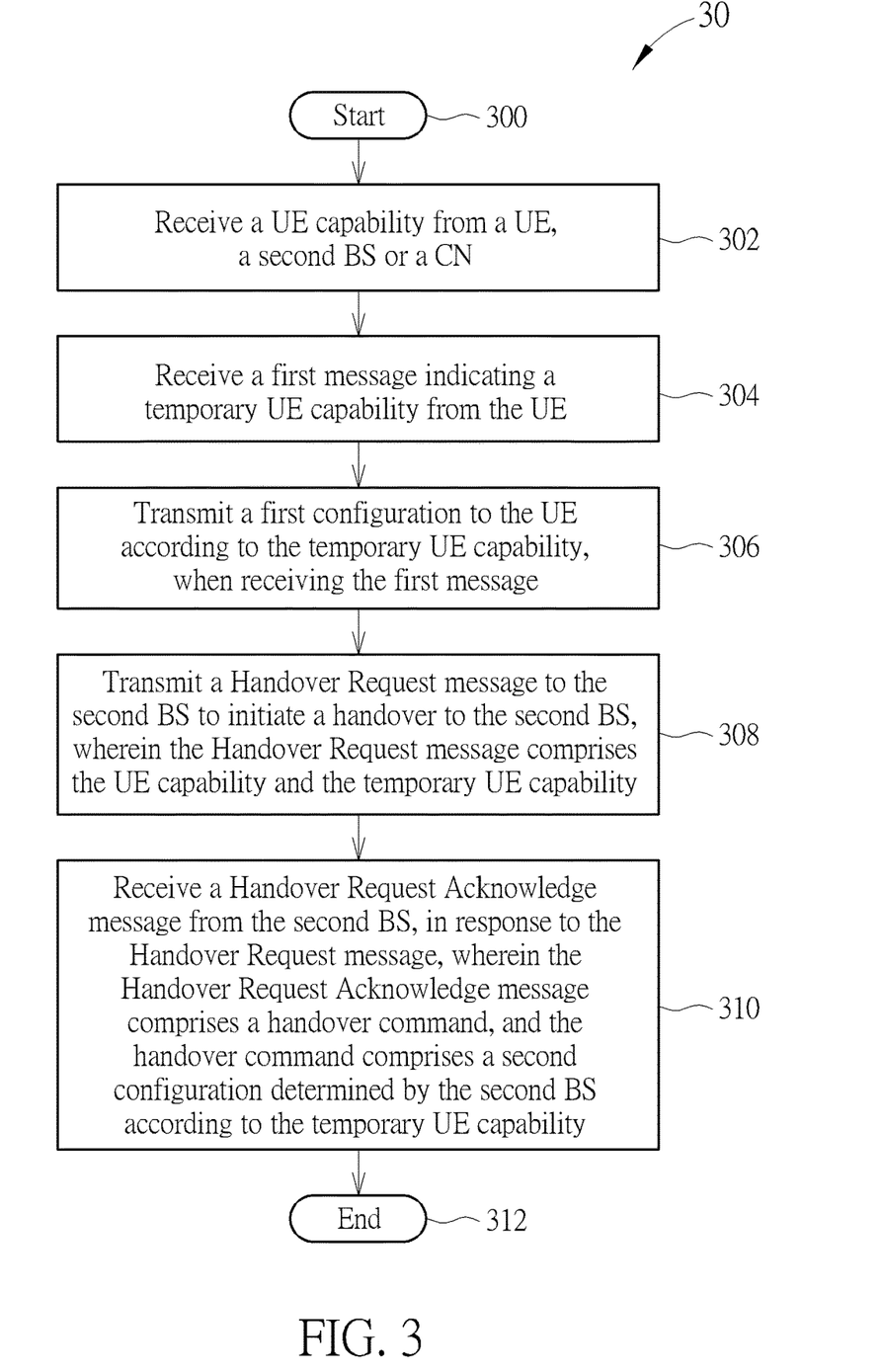
FIG. 3 is a flowchart of a process according to an example of the present invention.

A process 30 as shown in FIG. 3 can be utilized in a first BS, and includes the following steps:

Step 300: Start.

Step 302: Receive a UE capability from a UE, a second BS or a core network (CN).

Step 304: Receive a first message indicating a temporary UE capability from the UE.

Step 306: Transmit a first configuration to the UE according to the temporary UE capability, when receiving the message.

Step 308: Transmit a Handover Request message to the second BS to initiate a handover to the second BS, wherein the Handover Request message comprises the UE capability and the temporary UE capability.

Step 310: Receive a Handover Request Acknowledge message from the second BS, in response to the Handover Request message, wherein the Handover Request Acknowledge message comprises a handover command, and the handover command comprises a second configuration determined by the second BS according to the temporary UE capability.

Step 312: End.

The following examples may be applied to the process 30.

In one example, the UE transmits a second message to the second BS and the second message indicates to remove the temporary UE capability, if the UE wants (e.g., intends, or is instructed by a user) to remove the temporary UE capability (i.e., indicate to the second BS that the UE wants the second BS to use the UE capability instead of the temporary UE capability).

Figure 4:
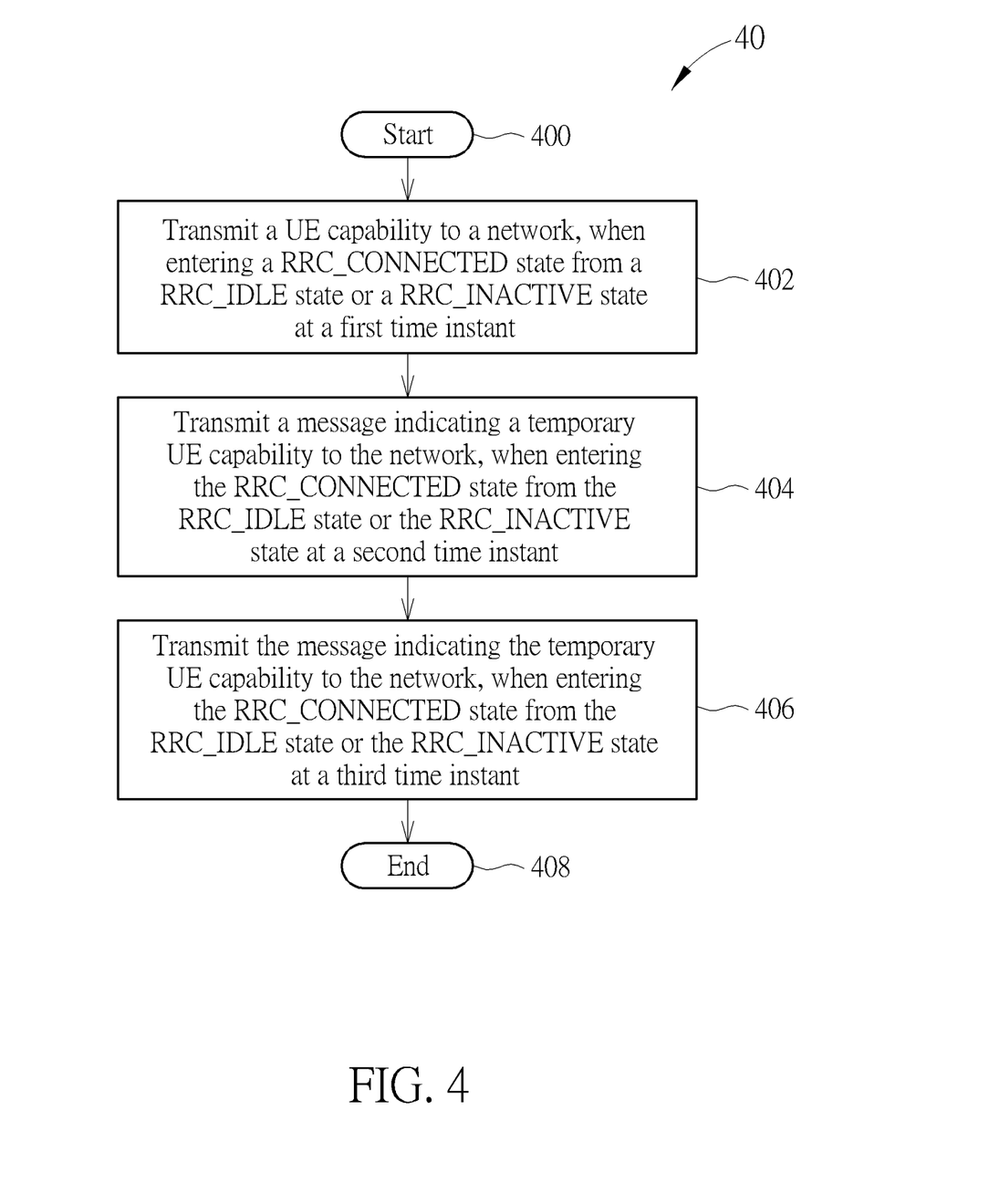
FIG. 4 is a flowchart of a process according to an example of the present invention.

A process 40 as shown in FIG. 4 can be utilized in a UE, and includes the following steps:

Step 400: Start.

Step 402: Transmit a UE capability to a network, when entering a RRC_CONNECTED state from a RRC_IDLE state or a RRC_INACTIVE state at a first time instant.

Step 404: Transmit a message indicating a temporary UE capability to the network, when entering the RRC_CONNECTED state from the RRC_IDLE state or the RRC_INACTIVE state at a second time instant.

Step 406: Transmit the message indicating the temporary UE capability to the network, when entering the RRC_CONNECTED state from the RRC_IDLE state or the RRC_INACTIVE state at a third time instant.

Step 408: End.

The following examples may be applied to the process 40.

In one example, the UE transmits the message indicating the temporary UE capability to the network (e.g., a first BS) via a first cell of the network, when connecting to the network via the first cell in the RRC_IDLE state or the RRC_INACTIVE state and determining to change the UE capability to the temporary UE capability. The UE enters the RRC_IDLE state or the RRC_INACTIVE state, when releasing a RRC connection. The UE in the RRC_IDLE state or in the RRC_INACTIVE state selects (or reselects) a second cell of the network (e.g., the first BS or a second BS), after releasing the RRC connection. The UE transmits the message indicating the temporary UE capability again, when connecting to the network via the second cell in the RRC_IDLE state or the RRC_INACTIVE state. The network is informed of that the UE wants to temporarily change the UE capability. The network configures a configuration to the UE according to the temporary UE capability. The UE does not need to worry about whether the network stores the message or not.

In one example, the UE transmits the message indicating the temporary UE capability to the network via a first cell of the network, when connecting to the network via the first cell in the RRC_IDLE state or the RRC_INACTIVE state and determining to change the UE capability to the temporary UE capability. The UE enters the RRC_IDLE state or the RRC_INACTIVE state, when releasing a RRC connection. The UE still selects the first cell of the network, after releasing the RRC connection. The UE transmits the message indicating the temporary UE capability again, when connecting to the network via the first cell in the RRC_IDLE state or the RRC_INACTIVE state again. The network is informed twice of that the UE wants to temporarily change the UE capability. The network configures a configuration to the UE according to the temporary UE capability. The UE does not need to worry about whether the network stores the message or not.

In one example, the UE transmits the message indicating the temporary UE capability to the network via a first cell of the network, when connecting to the network via the first cell in the RRC_IDLE state or the RRC_INACTIVE state and determining to change the UE capability to the temporary UE capability. The UE enters the RRC_IDLE state or the RRC_INACTIVE state, when releasing a RRC connection. The UE stops transmitting the message indicating the temporary UE capability, when connecting to the network via the first cell or the second cell in the RRC_IDLE state or the RRC_INACTIVE state and determining not to change the UE capability.

In one example, the UE determines to transmit the message when an event or a condition occurs in the UE. The event or the condition may be an overheating problem, a hardware component related to the UE capability is temporarily not available (e.g., the hardware component shared between WiFi and LTE/NR), or a battery capacity is lower than a predetermined threshold.

Figure 5:
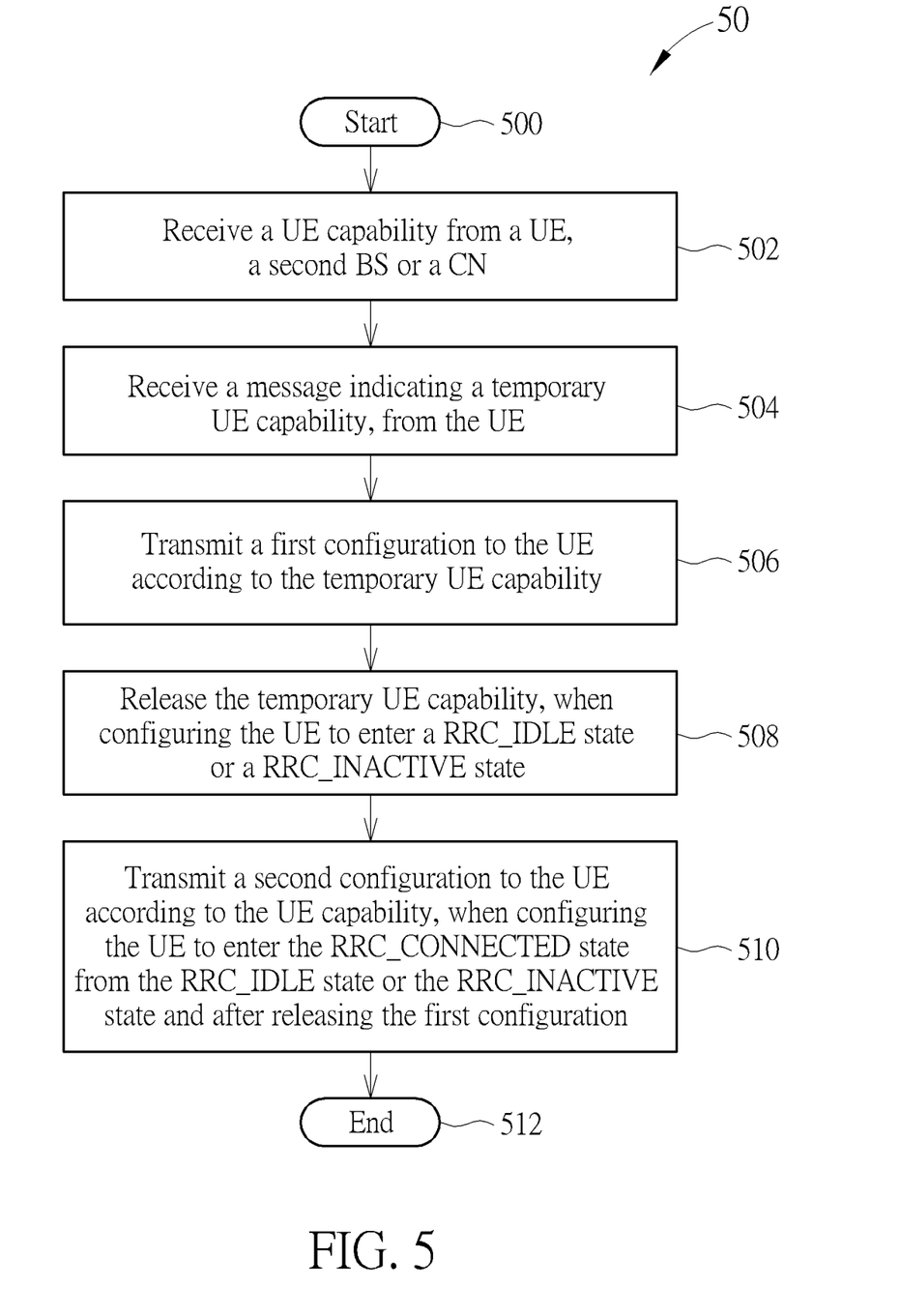
FIG. 5 is a flowchart of a process according to an example of the present invention.

A process 50 as shown in FIG. 5 can be utilized in a first BS and includes the following steps:

Step 500: Start.

Step 502: Receive a UE capability from a UE, a second BS or a CN.

Step 504: Receive a message indicating a temporary UE capability, from the UE.

Step 506: Transmit a first configuration to the UE according to the temporary UE capability.

Step 508: Release the temporary UE capability, when configuring the UE to enter a RRC_IDLE state or a RRC_INACTIVE state.

Step 510: Transmit a second configuration to the UE according to the UE capability, when configuring the UE to enter the RRC_CONNECTED state from the RRC_IDLE state or the RRC_INACTIVE state and after releasing the first configuration.

Step 512: End.

Figure 6:
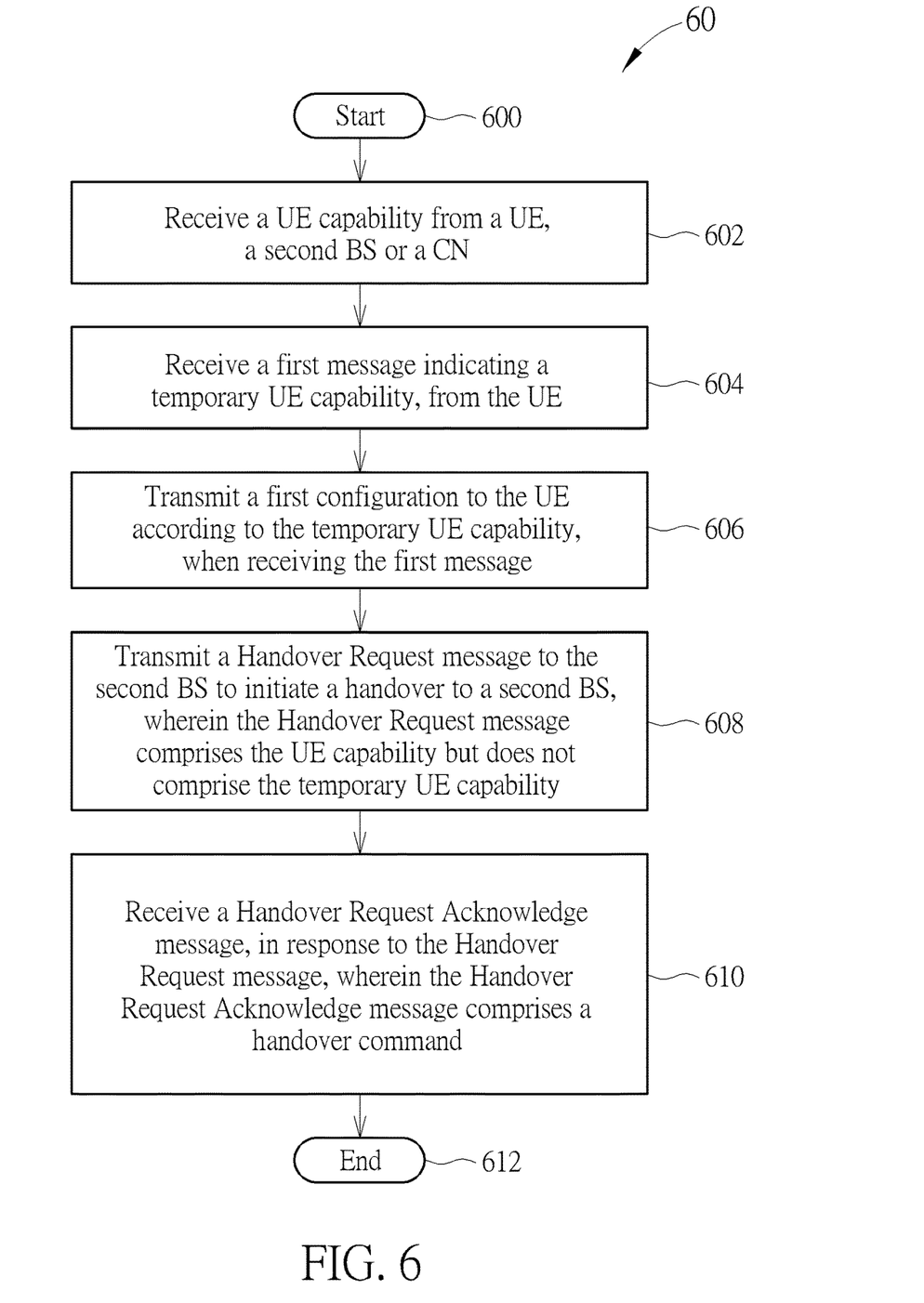
FIG. 6 is a flowchart of a process according to an example of the present invention.

A process 60 as shown in FIG. 6 can be utilized in a first BS, and includes the following steps:

Step 600: Start.

Step 602: Receive a UE capability from a UE, a second BS or a CN.

Step 604: Receive a first message indicating a temporary UE capability, from the UE.

Step 606: Transmit a first configuration to the UE according to the temporary UE capability, when receiving the first message.

Step 608: Transmit a Handover Request message to the second BS to initiate a handover to the second BS, wherein the Handover Request message comprises the UE capability but does not comprise the temporary UE capability.

Step 610: Receive a Handover Request Acknowledge message, in response to the Handover Request message, wherein the Handover Request Acknowledge message comprises a handover command.

Step 612: End.

The following examples may be applied to the process 60.

In one example, the handover command comprises a second configuration determined according to the UE capability. In another example, the second BS may transmit a RRC message configuring the UE according to the UE capability after receiving a handover complete message responding to the handover command from the UE.

The following examples may be applied to the processes 30-60.

In one example, the message indicating the temporary UE capability is a RRC message, is an IE comprised in the RRC message, or is a medium-access-control (MAC) control element comprised in a MAC PDU.

In one example, the UE capability may be comprised in a UE-EUTRA-Capability IE or a UE-NR-Capability (or called UE-5G-Capability) IE. The UE may transmit the UE-EUTRA-Capability IE or the UE-NR-Capability IE in a radio resource control (RRC) response message (e.g., a UECapabilityInformation message) to the network (e.g. the first BS) in response to a RRC request message (e.g., a UECapabilityEnquiry message) received from the network.

In one example, the UE capability comprises at least one of an access stratum release, a UE category, a plurality of physical layer parameters, a plurality of radio frequency (RF) parameters, a plurality of measurement parameters, a multi-input-multi-output (MIMO) capability, a carrier aggregation (CA) capability and an unlicensed access.

In one example, the CA capability comprises a list of a plurality of supported band combinations which defines the number of the aggregated carriers (e.g., carrier frequencies) supported by the UE for configurations with inter-band, intra-band non-contiguous, or intra-band contiguous CA and without CA in licensed or unlicensed band. In a band combination, the UE provides supported UL and DL CA bandwidth classes.

In one example, the MIMO capability applies to all DL carriers of a bandwidth class in a band combination. In one example, the UE may also indicate a separate MIMO capability applying to each individual carrier of a bandwidth class in a band combination.

In one example, the temporary UE capability is that the UE indicates to the network that the UE temporarily disables the CA capability. In one example, the temporary UE capability is that the UE indicates to the network that the UE temporarily disables or changes a supported band combination which indicates a maximum number of aggregated carriers the UE is capable of. For example, the UE capability includes a first supported band combination indicating support of 3 DL or UL aggregated carriers and a second supported band combination indicating support of 4 DL or UL aggregated carriers. The temporary UE capability is that the UE temporarily disables the second supported band combination. For example, the UE capability includes a supported band combination indicating a maximum of 3 DL or UL aggregated carriers. The temporary UE capability is that the UE temporarily updates the supported band combination to indicate a maximum of 2 DL or UL aggregated carriers.

In one example, the temporary UE capability is that the UE indicates to the network that the UE temporarily changes the MIMO capability. For example, the UE may indicate that the UE supports 4-layer or 4×4 MIMO in the MIMO capability in the UE capability, and may indicate the temporary change of the MIMO capability to 2-layer or 2×2 MIMO.

In one example, the UE capability is the unlicensed access. The temporary UE capability is that the UE indicates to the network the unlicensed access is disabled.

In one example, the network indicates in a system information (e.g., a system information block) or a RRC message (e.g., a RRCConnectionSetup message, a RRCConnectionResume message or a RRCConnectionReconfiguration message) that whether the UE is allowed to transmit the temporary UE capability to the network. If the UE is not allowed to transmit the temporary UE capability, the UE may perform an attach procedure or a tracking area update procedure. The UE may perform a detach procedure before the attach procedure or tracking area update procedure. The network transmits a UECapabilityEnquiry message to the UE after or during the attach procedure or the tracking area update procedure. Thus, the UE may change (e.g., update) the UE capability to the network (i.e., indicate the temporary UE capability) in a UECapabilityInformation message to the UE in response to the UECapabilityEnquiry message.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides methods and devices for handling a temporary UE capability. A problem that the first BS does not know how long the temporary UE capability takes effect is solved by the present invention. In addition, when the UE connects to a second BS from the first BS, the second BS receives the UE capability from the first BS. A problem that the second BS does not know that the UE temporarily indicates the change of the UE capability to the first BS is solved by the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station (BS) for handling a temporary user equipment (UE) capability, comprising:
   at least one storage device; and at least one processing circuit, coupled to the at least one storage device, wherein the at least one storage device store, and the at least one processing circuit is configured to execute instructions of:
   receiving a UE capability in a second message from a communication device, or from a second BS or a core network (CN);
   receiving a first message indicating a temporary UE capability from the communication device;
   transmitting a first configuration to the communication device according to the temporary UE capability, when receiving the first message;
   transmitting a Handover Request message to the second BS to initiate a handover to the second BS, wherein the Handover Request message comprises the UE capability and the temporary UE capability; and
   receiving a Handover Request Acknowledge message from the second BS, in response to the Handover Request message, wherein the Handover Request Acknowledge message comprises a handover command, and the handover command comprises a second configuration determined by the second BS according to the temporary UE capability;
   wherein the second BS receives a second message from the communication device, and the second message indicates to remove the temporary UE capability.

2. The first BS of claim 1, wherein the UE capability comprises one of an access stratum release, a UE category, a plurality of physical layer parameters, a plurality of radio frequency (RF) parameters, a plurality of measurement parameters, a carrier aggregation (CA) capability and an unlicensed access.

3. The first BS of claim 1, wherein the temporary UE capability indicates that the communication device temporarily disables a CA capability or a supported band combination or indicates that the communication device changes a multi-input-multi-output (MIMO) capability.

4. The first BS of claim 1, wherein the second message is a radio resource control (RRC) response message.

5. The first BS of claim 4, wherein the RRC response message is a UECapabilityInformation message.

6. The first BS of claim 1, wherein the instructions further comprising: transmitting a request message to the communication device; and receiving the second message in response to the request message from the communication device.

7. The first BS of claim 6, wherein the request message is a RRC request message and the second message is a RRC response message.

8. The first BS of claim 7, wherein the RRC request message is a UECapabilityEnquiry message and the RRC response message is a UECapabilityInformation message.

9. The first BS of claim 1, wherein the first message is a RRC message or a medium-access-control (MAC) control element comprised in a MAC PDU.

10. A method for a first base station (BS) handling a temporary user equipment (UE) capability, comprising:
    receiving a UE capability in a second message in a second message from a communication device, or from a second BS or a core network (CN);
    receiving a first message indicating a temporary UE capability from the communication device;
    transmitting a first configuration to the communication device according to the temporary UE capability, when receiving the first message;
    transmitting a Handover Request message to the second BS to initiate a handover to the second BS, wherein the Handover Request message comprises the UE capability and the temporary UE capability; and
    receiving a Handover Request Acknowledge message from the second BS, in response to the Handover Request message, wherein the Handover Request Acknowledge message comprises a handover command, and the handover command comprises a second configuration determined by the second BS according to the temporary UE capability;
    wherein the second BS receives a second message from the communication device, and the second message indicates to remove the temporary UE capability.

11. The method of claim 10, wherein the UE capability comprises one of an access stratum release, a UE category, a plurality of physical layer parameters, a plurality of radio frequency (RF) parameters, a plurality of measurement parameters, a carrier aggregation (CA) capability and an unlicensed access.

12. The method claim 10, wherein the temporary UE capability indicates that the communication device temporarily disables a CA capability or a supported band combination or indicates that the communication device changes a multi-input-multi-output (MIMO) capability.

13. The method of claim 10, wherein the second message is a RRC response message.

14. The method of claim 13, wherein the RRC response message is a UECapabilityInformation message.

15. The method of claim 10, wherein the instructions further comprising: transmitting a request message to the communication device; and receiving the second message in response to the request message from the communication device.

16. The method of claim 15, wherein the request message is a RRC request message and the second message is a RRC response message.

17. The method of claim 16, wherein the RRC request message is a UECapabilityEnquiry message and the RRC response message is a UECapabilityInformation message.

18. The method of claim 10, wherein the first message is a RRC message or a medium-access-control (MAC) control element comprised in a MAC PDU.

* * * * *